United States Patent Office 3,463,422
Patented Aug. 26, 1969

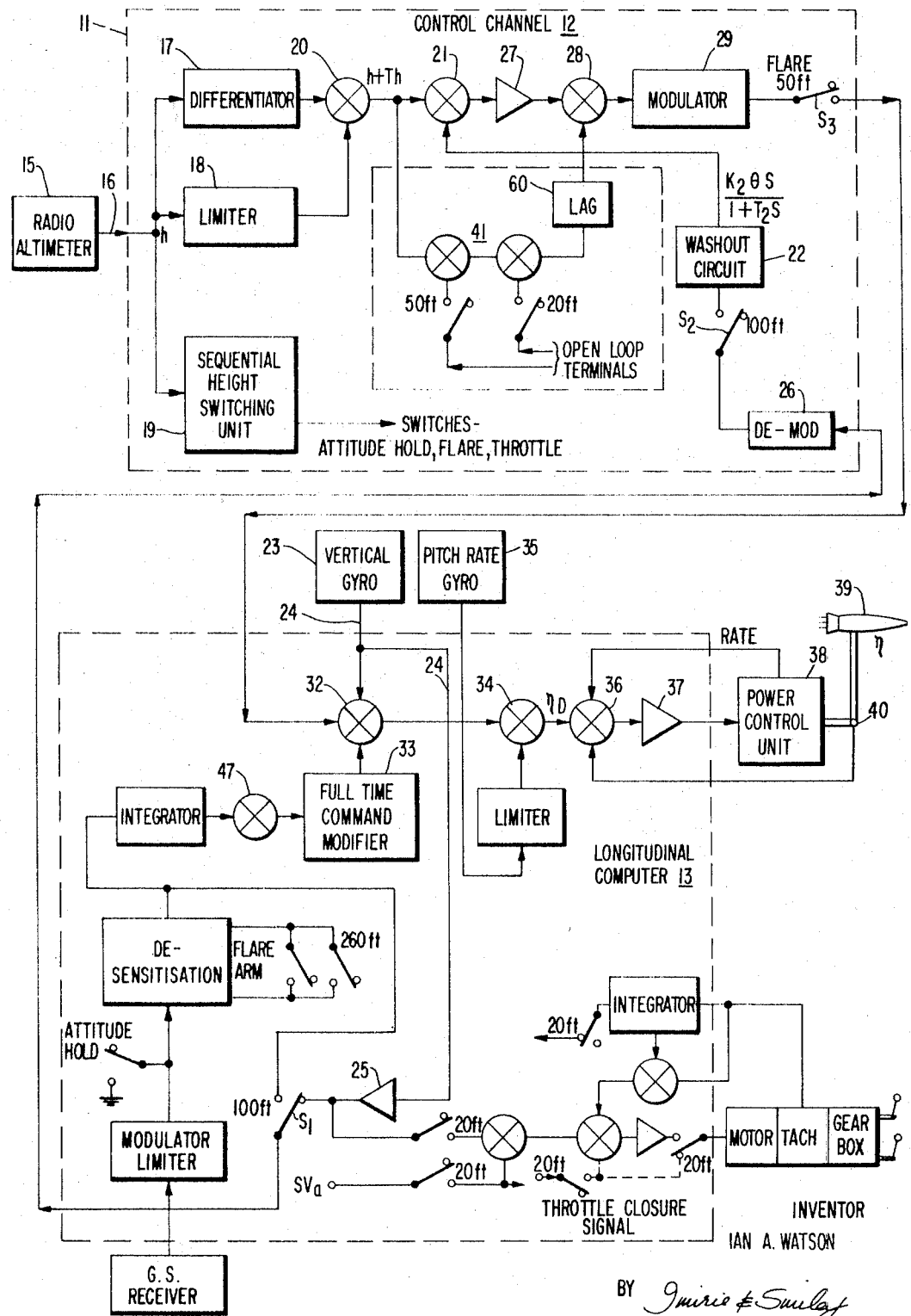

3,463,422
CONTROL OF AIRCRAFT
Ian A. Watson, Century Works, Lewisham,
London, SE. 13, England
Filed Jan. 30, 1967, Ser. No. 612,537
Claims priority, application Great Britain, Jan. 29, 1966,
4,057/66
Int. Cl. B64c 13/50, 19/00
U.S. Cl. 244—77                     2 Claims

ABSTRACT OF THE DISCLOSURE

A height plus height rate signal and a lagged signal of height plus height rate are used with high gain without sacrificing dynamic stability in an aircraft automatic landing system, by additionally using a washed out pitch attitude signal.

---

The invention relates to an automatic flight control system for aircraft particularly for use during the flare phase of landing.

It is an object of the present invention to provide an automatic flight control system by means of which the forward loop gain can be increased but without loss of stability of the system.

According to one aspect of the invention the system is arranged to produce a control signal capable of being utilized to control the flight path of an aircraft and includes means for deriving a signal from at least one of a number of respective flight parameters, said control signal being arranged to be the sum of the signals representing all said flight parameters and being augmented by said signal derived from said means (hereinafter called the operator means) to allow a control loop system to be provided having a high forward loop gain.

The system may include means capable of utilising said control signal to actuate the elevators or elevons of an aircraft and/or may include further means capable of utilising said control signal to provide a display on a flight director or flight monitor i.e. a situation display.

Switching means may be provided capable of causing said operator means to be normally ineffective but to be effective during flaring of an aircraft prior to landing.

According to a further aspect of the invention the system includes means capable of producing, from inter alia a signal representative of actual pitch attitude of the aircraft, a control signal caable of being utilised to actuate the elevators or elevons of the aircraft, washout means being provided arranged to produce an output signal representative of washed out pitch attitude which output signal is arranged to be added to the control signal at least during flaring of the aircraft.

Switching means may be provided arranged to be actuated according to altitude of the aircraft such that when the aircraft is above a predetermined altitude said washout means is rendered ineffective with respect to the control signal and when the aircraft is below said predetermined altitude said washout means is rendered effective with respect to the control signal.

Further means may be provided capable of utilising said control signal to provide a display on a flight director or flight monitor i.e. a situation display.

According to yet a further aspect of the invention a computer capable of computing a control signal for landing an aircraft from signals representative of demanded pitch attitude, actual pitch rate and actual pitch attitude, comprises means capable of producing a signal representative of washed out actual pitch attitude from the signal representative of actual pitch attitude, means capable of summing the respective signals representative of demanded height rate and washed out actual pitch attitude to provide a combined signal constituting a demanded pitch attitude signal and means capable of causing selective summation of the combined signal with the respective signals representative of actual pitch attitude and actual pitch rate, or signals directly proportional thereto, to produce said control signal.

The foregoing and further features of the invention will become apparent from the following description of a preferred embodiment thereof with reference to the accompanying drawing which is a block schematic representation of a monitored arrangement for controlling the elevators of an aircraft.

Referring now to the drawing the arrangement comprises a computer 11 consisting of a control channel 12 and a longitudinal computer 13.

A radio altimeter 15 has an output connected via lead 16 to the inputs of a differentiator 17, a limiter 18 and a sequential height switching unit 19. The outputs from differentiator 17 and limiter 18 are fed as inputs to a summing point 20 whose output is connected as an input to a further summing point 21.

A further input to the summing point 21 is connected from the output of a washout circuit 22. The input to washout circuit 22 is derived from a vertical gyroscope 23 via lead 24, amplifier 25, switch S1, demodulator 26 and switch S2.

The output of summing point 21 is connected via an amplifier 27 and a summing point 28 to the input of a modulator 29.

The output from the modulator 29 is connected to one side of a switch S3 and the other side of the switch S3 is connected as one input to a summing point 32 which derives further inputs from the vertical gyro 23 via lead 24 and from a full time command modifier 33. The output from summing point 32 is fed as an input to a summing point 34 which derives a further input from a pitch rate gyroscope 35.

The output from summing point 34 is fed via a summing point 36 and an amplifier 37 to a power control unit 38 which is mechanically linked to control the position of elevators 39 (one only shown). Feedback circuits are provided from the power control unit 38 and from a pickoff 40, associated with the mechanical linkage to elevators 39, the feedback circuits being connected to provide further inputs to the summing point 36.

Arrangement 41 in control channel 12 which derives an input from the output of summing point 20 and provides a further input for summing point 28 provides predetermined pitch up signals at predetermined altitudes of an aircraft carrying the apparatus under control of the sequential height switching unit 19. Such an arrangement is more fully disclosed and described in co-pending application Ser. No. 404,583, filed Oct. 19, 1964 and now abandoned, and therefore will not be further described herein.

In operation, during landing of the aircraft, signals representative of the altitude of the aircraft are fed from the radio altimeter 15 via the lead 16 to a differentiator 17 whose output signal plus the output from limiter 18 below the limiting height is representative of a height rate remand proportional to height below 50 ft. This height rate demand signal is fed as an input to summing point 21 where it is augmented with a signal representative of washed out pitch attitude from washout circuit 22. The output from washout circuit 22 is only provided when the aircraft is below about 100 feet, this being arranged under control of sequential height switching unit 19 which causes switches S1 and S2 to change over from the positions shown in the figure, to provide an input to washout circuit 22, when the aircraft reaches about 100 feet during a landing manoeuvre. The output from summing point 21 is then fed via amplifier 27, summing point 28, to modulator 29.

When the aircraft reaches an altitude of 50 feet switch S3 is caused to change over from the position shown in the drawing under control of sequential height switching unit 19. Hence the output signal from modulator 29 is fed to the summing point 32 where it is further augmented by a signal representative of pitch attitude derived from the vertical gyroscope 23 and a signal representative of stored pitch attitude at the end of the glide slope mode of operation limited by full time command modifier 33. The arrangements that provide the input to full time command modifier 33 are disclosed in co-pending application Ser. No. 612,535, filed Jan. 30, 1967 and therefore these arrangements will not be described herein.

The output from summing point 32 is fed to the summing point 34 where a further signal representative of pitch rate derived from pitch rate gyroscope 35 is further added. The output from summing point 34 which comprises the elevator demand signal $n_D$ is fed via summing point 36 and amplifier 37 to activate power control unit 38 to control the position of elevators 39.

A suitable arrangement for controlling the throttles of the aircraft and linked with the arrangement shown is disclosed in co-pending application Ser. No. 556,458, filed June 9, 1966.

Although the arrangement is merely shown for controlling the elevators of an aircraft it should be appreciated that the control signal produced could alternatively, or in addition, be utilised for providing a display in a flight director system or flight monitor i.e. a situation display.

The arrangement shown by utilising a signal representative of washed out pitch attitude to augment the control signal provides a high gain control system, for use during landing of the aircraft, which is less affected by external disturbances, e.g. gusts, without increasing the gain of the pitch attitude and pitch rate signals.

The problem is to provide a high forward loop gain without loss of stability in the control of the aircraft. With low values of forward loop gain there is no stability problem but the system is too sluggish accurately to follow the desired flight path during the flare phase of landing. By providing the washed out pitch attitude signal, high forward loop gain may be utilized without inordinate dynamic instability. Thus, the signal $h+Th$ from the summing point 20 is combined with washed out pitch attitude $$\frac{K_2\theta s}{1+T_2s}$$

at the summing point 21 while the lagged $h+Th$ signal is added at the summing point 28. The lag circuit 60 is of conventional form and has the general transfer function $$\frac{1}{1+s}$$

and the washout circuit 22 is also conventional, having the general transfer function $$\frac{s}{1+s}$$

The signal to the modulator 29 is of the form $$K_1(h+Th)\left(1+\frac{1}{1+T_2s}\right)+\frac{K_2\theta s}{1+T_2s}$$

the presence of the term $$\frac{K_2\theta s}{1+T_2s}$$

allowing the use of a high gain $K_1$ without sacrificing dynamic stability.

I claim:

1. In an aircraft automatic landing system of the type including a pitch attitude control channel having a pitch attitude actuator, and a vertical gyro having a pitch attitude output signal connected as an input to said actuator, the improvement comprising:
   an altimeter having a height output signal,
   means for differentiating, with respect to time, said height output signal,
   means for lagging said height output and differentiated height output signals,
   means for washing out said pitch attitude signal,
   and means for connecting said height output, said differentiated height output, said lagged height output and differentiated height output, and said washed out pitch attitude signals to said actuator during the flare phase of landing.

2. In the aircraft automatic landing system as defined in claim 1 including first summing means for combining said height output and differentiated height output signals, second summing means for combining the output of the first summing means with said washed out pitch attitude signal, and third summing means for combining the output of the second summing means with said lagged signal.

References Cited

UNITED STATES PATENTS 2,875,965 3/1959 Anderson et al.
3,265,333 8/1966 Montooth.
3,291,421 12/1966 Kramer et al. _____ 244—77

FERGUS S. MIDDLETON, Primary Examiner